United States Patent Office 3,233,463
Patented Feb. 8, 1966

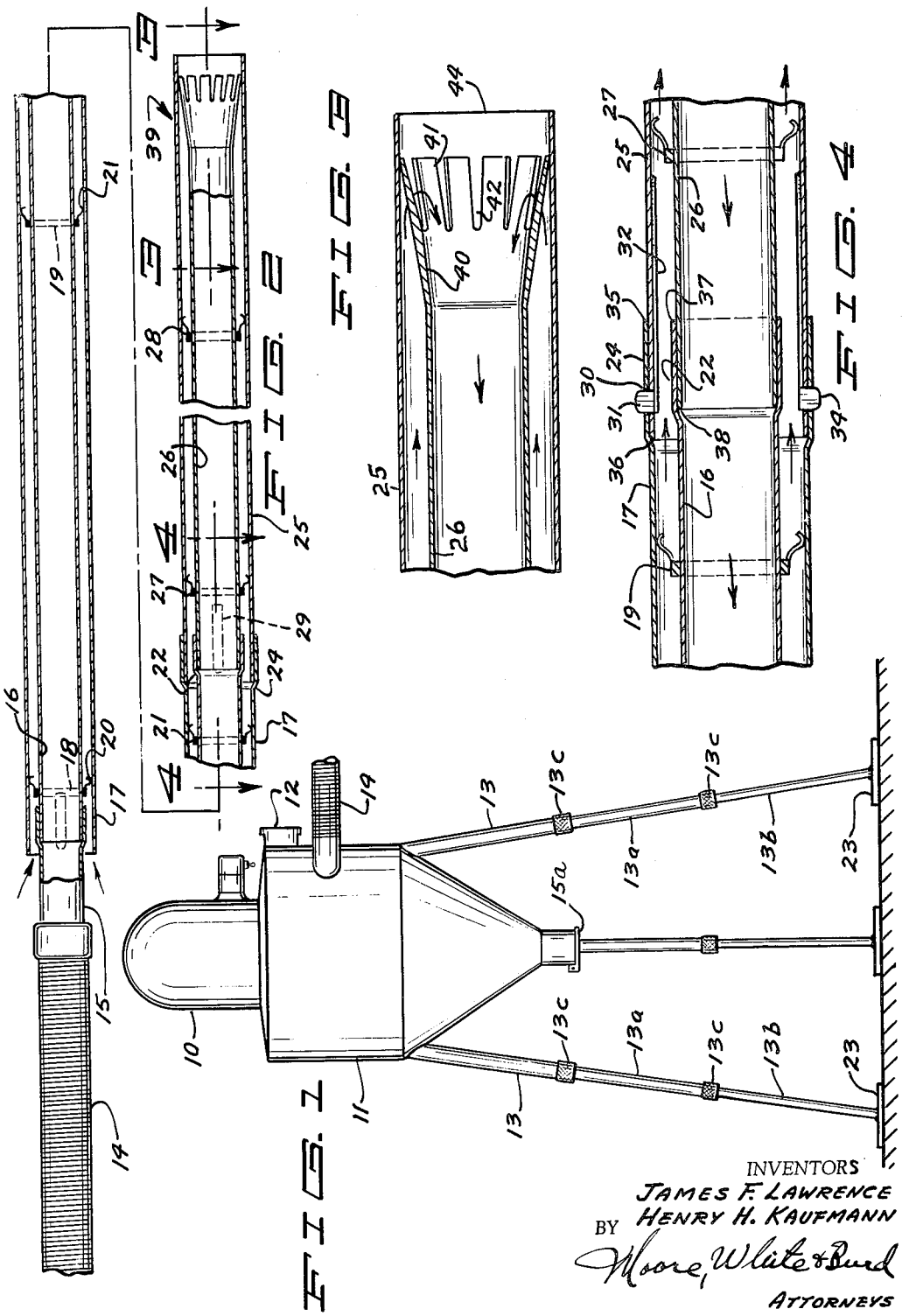

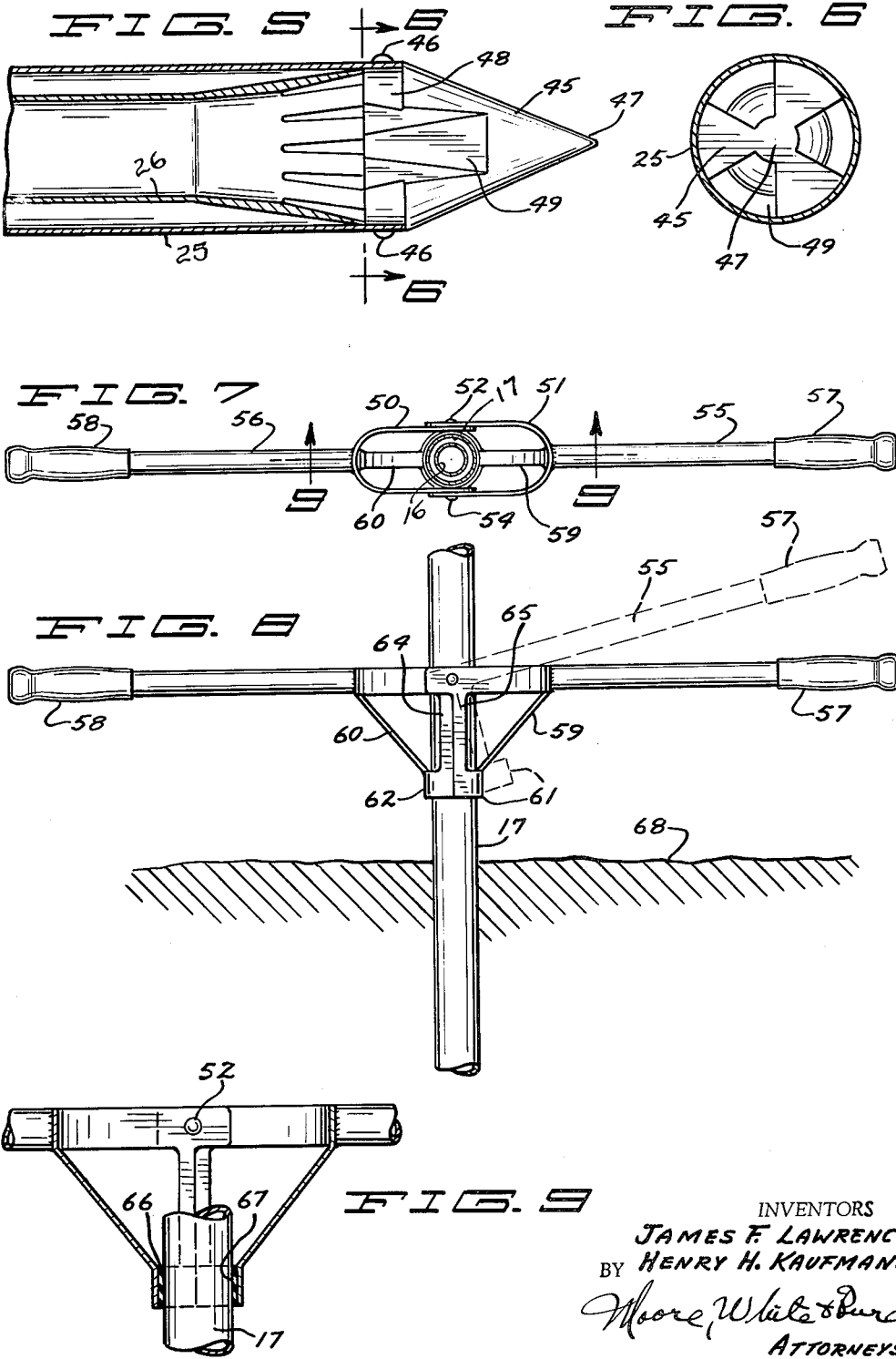

3,233,463
SAMPLING PROBE
Henry H. Kaufmann and James F. Lawrence, St. Louis Park, Minn., assignors to Cargill, Incorporated, Minneapolis, Minn., a corporation of Delaware
Continuation of application Ser. No. 100,132, Apr. 3, 1961. This application May 25, 1964, Ser. No. 372,137
10 Claims. (Cl. 73—421)

This application is a continuation of copending application of Henry H. Kaufmann and James F. Lawrence, Serial No. 100,132, filed April 3, 1961 for Sampling Probe, now abandoned.

This invention is related to the art of taking samples from masses of grain, oil seeds, meals, flours and other finely divided material hereafter referred to generally as granular material and features the use of differential air pressure for taking materials into the probe thus permitting deep penetration of the probe which a minimum of effort and time.

The invention also features a novel structure for the probe end or nozzle which permits adapting it readily to different types of materials to be sampled. Another feature of this invention consists of a novel means for forcing the probe into materials from which a sample is being taken out pneumatically whereby the probe may be driven depths in excess of 65 feet.

Heretofore the sampling of granulars has been done by means of probes having sampling compartments therein which may be closed and opened at a point remote from the probe end. These probes are used by forcing them into the material to the depth at which a sample is desired. The sampling compartment is then opened allowing sample grains at this depth to enter the compartment which entry may be encouraged by manipulating the probe slightly while the sampling compartment is opened. The probe may then be closed and withdrawn carrying with it the desired sample.

While samples thus obtained have been relied upon by commercial grain handlers for many years, it has been recognized that they have serious limitations as to the depths as to which they can be driven, the accuracy of the samples taken and in terms of the amount of time required to take the samples. Not only are these conventional probes slow, limited in depth and inaccurate in sample, but they also require considerable effort to force them as deeply as desired. Even maximum depth is inadequate in terms of some sampling problems as, for example, in modern grain storage where the grain may be piled to depths of forty to sixty feet or more.

One of the most serious failings of the conventional probe is its failure to sample to the bottom of trucks and railroad cars. It is an inherent feature of these probes to have a tapered point to permit driving them into the material to be sampled. The sampling compartment openings, for reasons of strength and ease of manufacturing, are spaced from the end of the probe at least six inches. Hence, even when the probe is driven to the bottom of a truck or railroad car, the bottom of the load is not sampled. This fact has been known to tempt people to purposely dilute loads of materials with worthless filler at the bottom of the load, for example.

The ability to sample grain in flat storage is important. Grain in good condition will store for a long time. On the other hand grain is subject to spoilage, and if such attack is very deep in a pile of grain, it may cause serious losses before discovery of it unless adequate sampling can be done regularly. Consequently, it is important to take samples from all depths of grain in storage and particularly in so called flat storage where no easy means for rotating or moving the grain from one bin to the other is available. Mass movement of grain in flat storage is desirably limited to cases of necessity to eliminate contaminated grain.

Likewise it is highly desirable to sample grain being brought to an elevator in order to determine which of the various available bins is considered the appropriate one for the new grain in terms of the quality and other characteristics of the load being presented. Conventional sampling is so slow and difficult it is usually impractical to hold a load of grain until sample anaysis was done. Rough estimation has been relied on, accordingly, to determine into which of various bins a particular load of grain should be placed. It is conceivable that with the rapid sampling device of this invention to have a sampling procedure that could determine precisely the condition of the material before unloading it.

Accordingly, it is a principal object of this invention to provide a novel sampling device or pneumatic probe.

It is a further object of this invention to provide a pneumatic probe that will penetrate to depths in excess of sixty-five feet.

Another object of this invention is to provide a pneumatic sampling probe that is fast in operation.

Yet another object of this invention is to provide a pneumatic probe having a convertible tip or nozzle for different types of materials.

It is a still further object of this invention to provide a pneumatic probe that samples to the bottom of the compartment from which a sample is being taken.

It is a further object of this invention that incorporates means for driving a probe to extreme depth that may also be employed for retrieving the probe.

It is a still further object of this invention to provide a pneumatic sampling probe comprised of a series of rigid, double tubes that can be secured together and provided with means for evacuating one tube of the probe and permitting atmospheric air pressure to enter the other tube and thereby carry particles up the evacuated tube by means of air flow.

It is another object of this invention to provide a novel probe in which an outer probe tube has means for securing sections thereof together to resist both compression and tension forces for both inserting and removing the probe and the inner tube through which the sample is taken is supported within the outer tube.

Still other objects are inherent in the specific structures disclosed and illustrated herein.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 1 is a side elevation of the vacuum producing portion of the invention;

FIGURE 2 is a partial side elevation partial longitudinal section of the air tube and probe drawn to a substantially larger scale than FIGURE 1; broken lines illustrate hidden parts;

FIGURE 3 is a sectional view taken on the line 3—3 of FIGURE 2 and drawn to a substantially larger scale than FIGURE 2;

FIGURE 4 is a sectional view taken on the line 4—4 of FIGURE 2 and drawn to the same scale as FIGURE 3;

FIGURE 5 is a view similar to FIGURE 3 but showing a nozzle adaptor tip in position; this figure is drawn to the same scale as FIGURES 3 and 4;

FIGURE 6 is a sectional view taken on the line 6—6 of FIGURE 5 and drawn to the same scale;

FIGURE 7 is a plan view of the means for inserting and withdrawing the probe; it is drawn to a scale between that of FIGURE 1 and FIGURE 2;

FIGURE 8 is a side elevation of the probe inserting and withdrawing device with broken lines illustrating adjusted position thereof; it is drawn to the same scale as FIGURE 7; and FIGURE 9 is a sectional view taken on the line 9—9 of FIGURE 7 and drawn to the same scale as FIGURE 2.

Referring to FIGURE 1 of the drawings there is seen a motor 10 which is secured to the cyclone separator housing 11 in which is mounted an air pump (not shown). The air pump is driven by the motor. Air is exhausted from the housing 11 at 12 and a low pressure area is created within the housing 11 to which the flexible hose 14 is connected. At the bottom of the separator housing 11 is a trap door 15a through which samples may be extracted. The entire structure is supported on legs such as those shown at 13 which may be conveniently telescopic and the sections 13a and 13b being slidably received within top sections 13. The legs are secured in an extended position in any suitable manner as by the nuts 13c. The lower ends of sections 13b terminate in the feet 23 so that the units may be placed on top of a pile of small particle granular material without sinking in.

Turning now to FIGURE 2 the flexible hose 14 from the cyclone separator is seen to terminate in an adaptor element 15 which slidably engages an inner tube 16 of any rigid probe element as shown in that figure. Adjacent to adaptor 15 the outer tube 17 of the rigid probe element is left open to the atmosphere. A pair of rings such as illustrated at 18 and 19 may be used to grip the inner tube 16. These rings carry the spring fingers 20 and 21 respectively which engage the inside of tube 17. The split rings 18–19 and spring fingers 20–21 roughly center tube 16 within the tube 17 and hold it in such a position.

The opposite ends of the tubes 16–17 from end secured to adaptor 15 are seen in the lower portion of FIGURE 2 to be enlarged as at 22 and 24 respectively. This enlargement of the tubes 16–17 permits them to slidably engage the upper ends of the tubes 25 and 26. Finger carrying rings as at 27 and 28 are also employed to center, approximately, the tube 26 within the tube 25.

While the sliding joint illustrated in FIGURE 2 is adequate to maintain tube rigidity when forcing the probe into the materials being probed, some means such as spring latch 29 is necessary in order to lock the units together to resist tension forces in order to withdraw the probe when sampling is completed. A suitable latch is shown in more detail in FIGURE 4. As shown there the enlarged end 24 of tube 17 is provided with openings as at 30 through which the lug 31 may extend. Lug 31 is secured by a resilient leaf 32 to the inside of tube 25. In order to release the tube 25 from the tube 17, the lug 31 and its counter part 34 are manually depressed and the tubes pulled apart. A reverse procedure is used when the tubes are to be placed together.

As shown at 35 the enlarged end 24 of tube 17 may be beveled on the inside whereby the end of tube 25, exteriorly beveled as at 36, is easily inserted. The enlarged end 22 of tube 16 is likewise beveled on the inside as at 37 and tube 26 may be beveled on its outside end as at 38 to allow similarly easy engagement of the inside tube ends.

Referring again to FIGURE 2, the lower end of tube 25, or that end illustrated at the right hand side of FIGURE 2, is provided with a nozzle generally designated 39. The outer end of the nozzle is simply an extension of tube 25. The nozzle at the inside, however, has a flared member 40 with a series of spaced finger like elements 41 which extend outward from the inner tube to engage the inside of the outer tube yet leaving the openings 42 therebetween. These spaced fingers serve to hold the inner tube spaced from the outer tube at the nozzle end and also allow air to pass from the outer tube into the inner tube through the spaces 42. Although the nozzle is formed here as the termination of the larger tube embracing the smaller tube, it is clear that this structure could be achieved to provide an air inlet channel around the evacuated tube without necessarily having the tubes concentric throughout.

Fingers 41 terminate a distance spaced from the end 44 of tube 25. The reason for this is clear upon viewing FIGURES 5 and 6 wherein a special nozzle end 45 may be seen inserted into and secured to the end 44 of tube 25 in any suitable manner as by the screws 46. A tip or nozzle designated 39 is of the sort that would be used in less fluid particle materials such as corn or the like. More fluid materials such as wheat and flax require greater limitation on the nozzle opening size and hence the tip adaptor 45 is fitted into the end 44 of tube 25. While many different shapes could be used for adaptor 45, a cone seems to be desirable on two counts. The point aids in ease of penetration in closely packed materials and the base lends itself to forming the reduced portion 48 which slidably fits into the end 44 of the nozzle 39. At intervals around the cone channels, such as the one designated 49, are cut which communicate with the nozzle 39 to provide access for limited quantities of more fluid materials.

In FIGURE 7 is shown the probe driving member which consists of a pair of yokes 50 and 51 that have their ends pivoted together suitably as by the pins 52 and 54. Handles 55 and 56 are secured to the yokes, and each handle may be provided with hand grips such as the ones designated 57 and 58. Strap members 59 and 60 extend down from the yokes to a divided collar having the two halves 61 and 62. In FIGURE 8 additional strap members designated 64 and 65 complete the rigid connection between the split collar 61–62 and the yoke members.

The broken lines in FIGURE 8 show how the handles 55 and 56 are moved to open the split collar 61–62. At the inside of the collar resilient tube gripping material is fixed as shown at 66 and 67 for the collars 62 and 61 respectively. This resilient material causes the split collar 61–62 to grip a tube such as the one designated 17 and provides substantial leverage for forcing the tube 17 into material being probed, represented in FIGURE 8 at 68. When it is desired to extract the probe, the forcing assembly is removed altogether and reversed on the unit. This is easily accomplished by removing adaptor 15 and hose 14. The gripping collar 61—62 will then operate to grip when a removing force is being applied to handles 55 and 56 rather than when an inserting force is applied.

Tube gripping structure 50–67 is provided in order to make it possible to force the probe to great depth, under many circumstances it is not necessary to use it. When probing a depth of from five to twenty feet (depending on the material) the fact that material is being constantly removed from the nozzle of the probe causes it to penetrate almost automatically. Under such condition there is no necessity for the probe forcing handle 60–67.

Regardless of material, at any substantial distance beyond twenty feet in depth, however, the probe gripping is necessary in order to get the probe down. At greater depths, drag or friction of the material on the probe tubes is too great to cause the weight of the probe to carry it down into the material being sampled merely by removing granules at the nozzle end.

The diameter and thickness of the walls of the tubing used in constructing the probe will depend on the purposes which the probe is put. In giving the following dimensions, rate of air flow, and static pressure differential, it is intended only to provide an illustrative example of a device that has been used successfully in sampling grains of varying sizes and at depths of from 40 to 65 feet. For the type of sampling mentioned, an aluminum outer tube having an outside diameter of 2 inches and a wall thickness of from .048 to .18 is recommended. An inside aluminum tube that will be very satisfactory for use with the outer tube described is one having an outside diameter of 1¼ inches with a wall thickness of .049 inch. A desirable minimum for rate of air flow desired to be probed is approximately 200 cu. ft. per minute. A static pressure differential of 1½ inches of water is necessary in order to lift corn kernels, for example.

The foregoing dimensions, rate of air flow, etc. may be altered to provide a suitable probe for whatever materials are to be sampled. One having dimensions, air flow characteristics and static pressure differential maintaining ability described above will lift corn a distance in excess of 65 feet. When the adaptor tip for a smaller material is in place, in order to use the probe in more fluid granular material, the above described device has been used at depths in excess of 70 feet, with no indication that this was the limit to which it could be driven.

Another advantage of the probe of the instant invention is that it may be used to fumigate precisely where fumigation is needed. If in sampling an area it is discovered that it requires fumigation, the probe may be stopped at the depth indicated. By removing adaptor 15, a channel is provided down through the grain to the precise point at which fumigation is needed. When sufficient fumigants have been pumped into the grain at the indicated point, sampling is resumed.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A probe element comprising a plurality of rigid, elongated elements each comprising an outer tube, an inner tube of substantially smaller diameter than said outer tube, selectively engageable fasteners secured to said tubes for releasably connecting said rigid, elongated elements together with the inner tubes thereof in substantially airtight communication with each other; said selectively engageable fasteners acting to resist both compression and tension forces exerted on the joint between consecutive tubes, and a nozzle formed at one end of said probe element including structure secured to said inner tube and extended from the inner tube outwardly toward said outer tube for restricting the amount of material presented to said inner tube at a given instant to an amount approximating and less than selectively the capacity of said inner tube, the end of the inner tube of said rigid elongated elements remote from said nozzle adapted to be connected in substantially airtight engagement with a source of vacuum.

2. The probe element of claim 1 in which said nozzle comprises having the end of said inner tube near one end of said outer tube flared in the form of spaced fingers the outer ends of which engage the inside of said outer tube.

3. The probe element of claim 2 in which the ends of said spaced fingers are spaced inwardly from the terminal end of said outer tube, and a tip removably secured to and filling said outer tube end; said tip having passageways cut therein beginning at a point spaced from the outer end thereof and extending into communication with the inside of said outer tube.

4. The probe element of claim 3 in which said removable tip is generally cone shaped and has a reduced portion adjacent its base that slidably engages the inside of said outer tube adjacent said spaced fingers, and means engaging said outer tube and said cone member for securing it rigidly therein.

5. The probe element of claim 4 in which there is means for alternately gripping and releasing said outer tubes for forcing said probe element into and removing it from, selectively, deep piles of material to be sampled.

6. The probe element of claim 1 in which there is a hinged gripping assembly including semi-cylindrical gripping means, handles secured to said semi-cylindrical gripping means, and hinge means formed on said semi-cylindrical gripping means spaced therefrom whereby hinging said hinged gripping means in one direction releases and in the other grips said outer tubes for forcing said probe element into and removing it from, selectively, deep piles of material to be sampled.

7. A pneumatic probe comprising: a cyclone separator, a flexible conduit communicating with said separator, a plurality of elongated, rigid, double tubes one of which is adapted to be connected in airtight engagement with said flexible conduit, means for interconnecting said elongated rigid double tubes with one of the tubes of each thereof in substantial airtight relationship with others and the second tube of each being releasibly joined to others said rigid elongated double tubes comprising smaller tubes arranged inside larger tubes; a nozzle comprising an end of a smaller tube being flared and formed into spaced fingers the ends of which engage the inside of a larger tube formed in the double tube end most remote from said flexible conduit, said larger tubes remote from said nozzle being open to the atmosphere; whereby atmospheric air may be admitted to said smaller tubes via the larger of said tubes.

8. The pneumatic probe of claim 7 in which there is a divided collar, means secured to said divided collar hingably securing the parts thereof together at a distance therefrom greater than the diameter formed when said divided collar portions are placed in juxtaposition to form a complete collar, and handle means extending from said divided collar a substantial distance for alternately pivoting them away from and toward each other.

9. The pneumatic probe of claim 8 in which said divided collar has resilient gripping means secured to the inside thereof.

10. A pneumatic probe element comprising: at least two double tubes each of which is elongated and rigid, a first tube of each double tube adapted to be secured to the corresponding tube of the other double tube in substantially airtight communication therewith, complementary releasible latch means irremovably secured to the second tube of each double tube; whereby any one of said second tubes may be rigidly and separable joined to the corresponding second tube of any other double tube; said complementary latch means resisting both compression and tension forces applied thereto, a nozzle formed at an end of one of said double tubes through which material to be sampled enters; said nozzle interconnecting said first and second tubes of said one double tube and limiting the amount of sample material entering said first tubes to less than the capacity of said first tubes; and means for placing said first tubes in communication with a vacuum; said second tubes being open to the atmosphere; whereby atmospheric air rushing into the evacuated first tubes from said second tubes via said nozzle carries sampled material suspended in an air stream and material in quantities sufficient to plug said first tubes is held from reaching them.

References Cited by the Examiner
UNITED STATES PATENTS

| | | | |
|---|---|---|---|
| 1,229,273 | 6/1917 | James et al. | 73—425.2 |
| 1,416,013 | 5/1922 | Geiseler | 302—58 |
| 1,994,884 | 3/1935 | Chew | 73—425.2 X |

(Other references on following page)

UNITED STATES PATENTS

| | | | |
|---|---|---|---|
| 2,512,116 | 6/1950 | Siebels | 138—113 |
| 2,650,112 | 8/1953 | Kinkead | 285—133 X |
| 2,771,776 | 11/1956 | Haven | 73—421 |
| 2,910,311 | 10/1959 | Carr | 285—133 |

FOREIGN PATENTS 300,998  10/1917  Germany.

LOUIS R. PRINCE, *Primary Examiner.*
RICHARD QUEISSER, *Examiner.*